March 24, 1931.  G. GRINDROD  1,797,769
APPARATUS FOR HEAT TREATING FOODS
Filed Feb. 2, 1928  2 Sheets-Sheet 1

INVENTOR.
George Grindrod
BY
Erwin, Wheeler & Woolard
ATTORNEYS

March 24, 1931.  G. GRINDROD  1,797,769
APPARATUS FOR HEAT TREATING FOODS
Filed Feb. 2, 1928  2 Sheets-Sheet 2
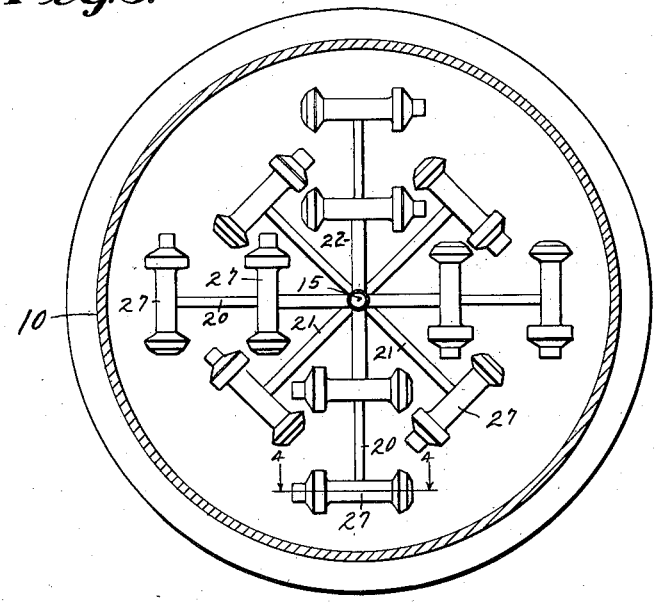
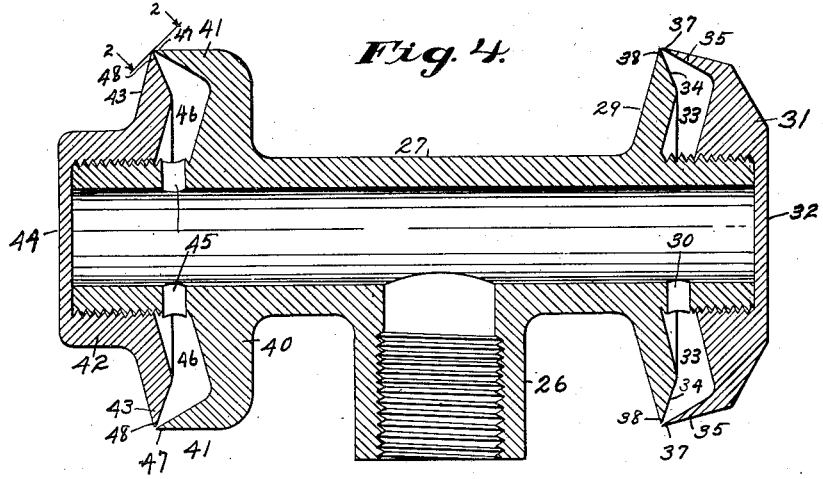
INVENTOR.
George Grindrod
BY
Erwin, Wheeler & Woolard
ATTORNEYS.

Patented Mar. 24, 1931

1,797,769

UNITED STATES PATENT OFFICE

GEORGE GRINDROD, OF OCONOMOWOC, WISCONSIN, ASSIGNOR TO GRINDROD PROCESS CORPORATION OF WAUKESHA, WISCONSIN, A CORPORATION OF WISCONSIN

APPARATUS FOR HEAT TREATING FOODS

Application filed February 2, 1928. Serial No. 251,305.

This invention relates to improvements in apparatus for heat treating foods with particular reference to apparatus of that type in which the food particles are subjected to direct contact with steam.

In Patent No. 1,714,597, dated May 28, 1929, granted on my former application, Serial No. 734,566, filed August 28th, 1924, I have shown and described a process of sterilizing milk and other liqui-form food products contained within a nearly closed reservoir by injecting steam into such food products through multiple ports or apertures formed in the wall of the receptacle, the ebullition or agitation of the contents being relied upon to successively present particles of material to the steam jets in addition to those particles in direct paths of the steam first injected into the receptacle.

Objects of this invention are to provide improved means for distributing steam throughout material contained in a receptacle or reservoir; to provide means, independent of the ebullition of the contents, for ensuring direct contacts of steam with each particle of material; to provide means for directing steam jets at progressively varying angles into the material and simultaneously agitating the material both mechanically and by ebullition; to provide steam distributing means in which the advantages attendant upon the use of a multitude of steam jet nozzles may be attained at small cost by a few travelling nozzles each arranged to deliver a sheet of steam along conically divergent lines; to provide for the delivery of steam into the material along a plurality of overlapping conically divergent lines; to establish conical zones of treatment and also to progressively change the axis of each conical zone whereby the direction taken by successive particles of steam derived from each single source is continuously changed, the jets of steam being caused to move with a sweeping effect through the material; to provide steam distributing jets capable of operating within large bodies of material in a manner to reach all portions thereof within a minimum period of time; and to accomplish such results by means of apparatus which can be easily and quickly cleansed and which can be produced at minimum cost.

In the drawings:

Figure 3 is a sectional view drawn to plane indicated by line 3—3 of Fig. 1.

Figure 4 is a sectional view of one of the nozzle units drawn to a plane indicated by the line 4—4 in Fig. 3.

Like parts are identified by the same reference characters throughout the several views.

Figure 1:
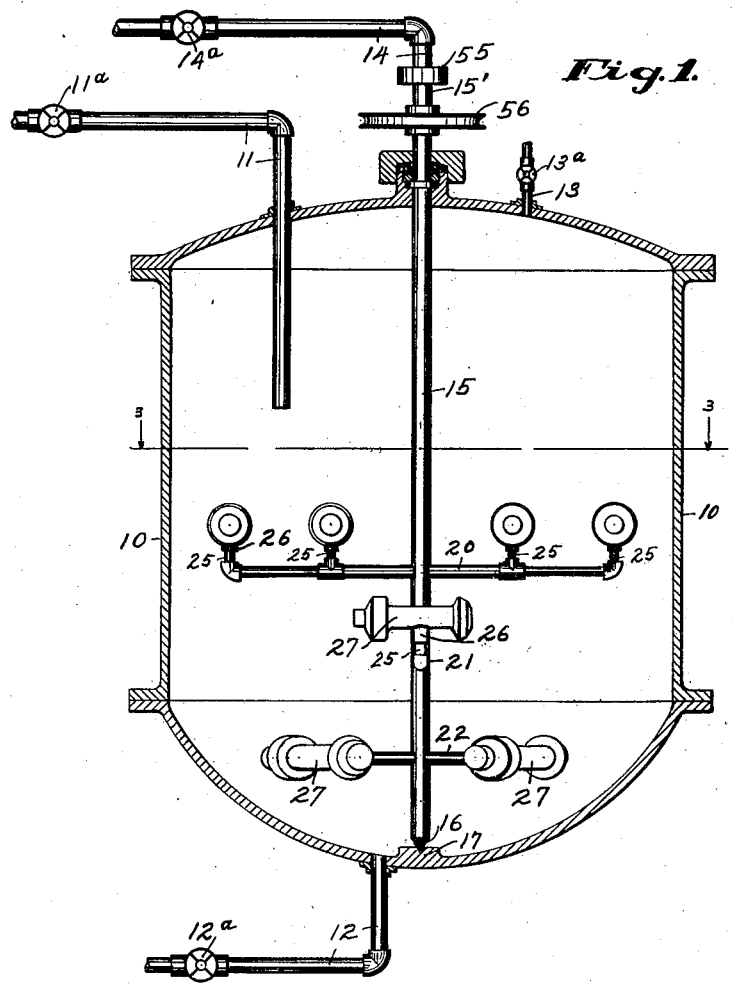
Figure 1 is a vertical sectional view of heat treating apparatus embodying my invention.

The receptacle 10 may receive the food material to be treated through the inlet duct 11, and after the treatment the material may be drawn off through a drain duct 12. The flow of material through these ducts may be controlled by valves 11a, 12a, and the excess steam rising from the surface of the material within the reservoir may be allowed to escape through a vent 13 through which the flow of steam will ordinarily be controlled by a valve 13a.

Steam is delivered into the receptacle through a supply pipe 14 provided with a valve indicated at 14a. The pipe 14 preferably includes a vertically disposed tubular shaft section 15 adapted to rotate upon its own axis, this pipe section having a closed and tapered lower end 16 in point bearing contact with a recessed bearing block 17 at the bottom of the receptacle. The tubular shaft section 15 is provided with radially extending groups of branches 20, 21 and 22 arranged with those of each group preferably in the same horizontal plane and radially divergent. Each of these branch pipes or ducts has one or more upwardly projecting nozzle carrying nipples 25 which support and communicate with a distributing chamber or barrel 27. Each barrel 27 is preferably horizontally disposed in a plane transverse to the axis of the radially extending branch pipe which supports it and is threaded at each end. Near one end of the barrel 27 there is an outwardly extending integral nozzle flange 29, and at the outer side of this flange, the barrel has nozzle supply ports 30. A capping member 31 has threaded engagement with this end of the barrel and also carries an annular nozzle wall 32 which co-operates with the flange 29 to form a nozzle cavity, 33. The capping portion 31 limits the distance to which the nozzle wall 32 can be moved inwardly upon the end of the barrel and ensures an annular nozzle cavity 33 which registers with the ports 30. The inner surface 34 of the marginal portion of the nozzle member 29 is beveled and this beveled portion of the nozzle member is overhung or covered by a conically pitched flange 35 on the nozzle wall 32. The inner and outer surfaces of the portion 35 converge to a thin edge margin at 37 in close proximity to the edge margin 38 of the nozzle member 29.

At the opposite end of the nozzle barrel 27 there is a nozzle member 40 corresponding in position with the nozzle member 29, but having the general form of the nozzle member 32, especially in its outer portion which has a marginal flange 41, quite similar in form to the flange 35 of the member 32. This end of the barrel also receives a cap 42 which carries a flange or co-operating nozzle member 43 having a conically pitched or beveled inner surface. The central portion 44 of this cap closes the associated end of the barrel 27. Ports 45 communicate between the interior barrel cavity and a nozzle cavity 46 which corresponds generally with the nozzle cavity 33. The inner and outer walls of the marginal portions of the parts 41 and 43 converge to thin edges 47 and 48 which are in close proximity to each other and adapted to allow the escape of fluid from between them substantially in a conical sheet and along lines parallel to those taken by fluid escaping between the marginal edges 37 and 38 of the nozzle at the other end of the barrel, whereby the conical sheets of steam will over-lap.

Figure 2:
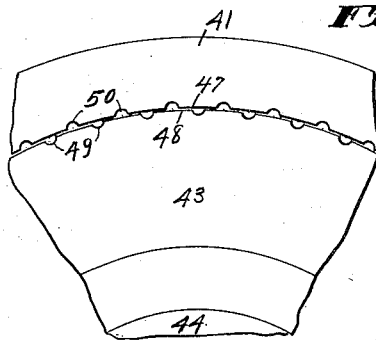
Figure 2 is an enlarged fragmentary sectional view of an arcuate portion of one of the nozzles, the section being taken along an imaginary conical surface, the pitch of which is indicated by line 2—2 of Fig. 4.

Owing to the difficulty of maintaining the integrity of the steam jet in the form of a sheet and in the desired volume, I preferably provide each marginal portion 37, 38, 47 and 48 with semi-cylindrical grooves extending in the general direction of steam delivery through the nozzles. These grooves may be readily formed by screwing the cap members into place until their margins are brought closely into contact with the margins of the integral nozzle members, then drilling or reaming an annular series of holes into the material composing these nozzle margins and then slightly rotating the cap members relatively to each other to off-set the portion of the hole in one nozzle member with reference to the portion of the same hole in the other nozzle member, thereby providing semi-cylindrical grooves 49 and 50 in the respective nozzle members, as clearly shown in Fig. 2. The drill employed as above described is preferably .05 inches in diameter. Preparatory to drilling the holes, the cap members may be screwed into a position of contact with the associated fixed nozzle members, and after the holes are drilled they may be backwardly rotated until the semi-cylindrical grooves are equally spaced from each other as shown in Fig. 2. The backward rotation also provides a slight separation of the nozzle margins between the grooves, although the quantity of steam escaping along such margins between the grooves will be negligible. In this manner substantially all of the steam may be delivered in jets but the annular series of jets are in such proximity as to form substantially a conical sheet or blast of steam.

While I prefer to employ a circular or conical nozzle or a nozzle which delivers steam along the lines of an imaginary cone, I do not limit the scope of my invention in this particular. It is obvious that any nozzle formed by two relatively movable members, the margins of which may be adjusted into and out of contact or proximity preparatory to the drilling operation above described and also transversely, to offset the drilled grooves in one with reference to the drilled grooves in the other, will make possible an almost unlimited multiplication of fine jets. But beyond this I attach great importance to the fact that jets should be aimed in different directions to satisfy the requirement for adequate distribution, and the cone shaped nozzle structure provides a simple and inexpensive means for obtaining an indefinite number of jets of varying directions not only within the plane of rotation but also above and below that plane.

In order to deliver the steam in the form of jets, as distinguished from structures which merely allow it to escape in the form of bubbles, it is, of course, necessary to provide nozzles having constricted outlets or nozzle apertures so that steam pressure may build up in the passages leading to such outlets. The term nozzle as herein employed is intended to define a structure in which the fluid may be delivered in the form of jets through constricted nozzle outlets, as distinguished from mere delivery tubes through which steam passes without material pressure in excess of the resistance afforded by the liquid into which the steam is discharged. Mere outlet passages are not to be regarded as nozzles within the meaning of this description because they do not provide for the jet deliveries necessary for adequate distribution of the steam throughout the liquid to be sterilized.

It is well understood in the art to which this invention pertains that by providing true nozzles permitting pressure to build up in cavities immediately adjacent to the outlets, it is possible to deliver steam into liquid at a high velocity. If the steam pressure in the cavity exceeds by fifty eight per cent (58%) that of the liquid at the point of steam injection, the velocity of the steam in a cylindrical or semi-cylindrical nozzle outlet, may be assumed to be approximately 1400 feet per second.

It will be observed that these jets, in the structure disclosed, are projected from any given nozzle along the surface of an imaginary cone having the nozzle apertures adjacent to its apex. When the nozzle barrels 27 are in horizontal planes it will, therefore, be obvious that some of the jets will be delivered substantially in that plane and all others will be delivered along oblique lines above and below said plane and extending divergently from said plane and from each other.

Each nozzle barrel 27 preferably comprises a T-shaped fitting, the supporting shank 26 of which is screwed upon the upper end of the associated nipple 25. The terms "outwardly" and "inwardly" as herein used to define the conical pitch of the flange-like nozzle members 29 and 43, respectively, have reference to the central transverse line of the barrel, including the axis of shank 26. The member 29 is pitched outwardly or away from such central plane and the member 43 is pitched inwardly or toward it, both nozzles, therefore, delivering their conical jets in the same direction.

The branch supply pipes 20, 21 and 22 are located at different levels. The pipes of each set may be of different lengths and each such pipe may carry any desired number of associated nozzle barrels. By employing nozzles which deliver jets of steam which have a pitch in a direction other than in a horizontal plane, and particularly by employing nozzles each of which delivers jets or sheets of steam along lines which diverge in the surface of an imaginary cone, and sets of nozzles which produce overlapping steam cones, I am enabled to reach all levels between those of the nozzle supporting branch supply pipes as well as the zone above the topmost pipes and that below the lowermost ones. It will be obvious that by adding a rotative movement to the central tubular shaft or main, the various particles of material to be treated by direct contacts of steam particles may be reached within a minimum period of time possible for the treatment of such materials in mass or by what may be termed the batch method.

The effectiveness of the result, i. e., the sterilization or even the pasteurization of the material without deterioration or impairment of flavor and without chemical change such as the breaking down of fat globules, is dependent upon the subjection of all particles of the material to direct contact of steam with minimum rise of temperature in the mass, and the minimum number of exposures of each particle, after an exposure which is adequate, both quantitatively in the sense of proportionate volume of steam and food particles and qualitatively in the sense of the heat units carried by the steam and if not its momentum and degree of saturation.

The rotation of the vertical supply main may be caused by any suitable means. In the drawings, the section 15' is swivelled at 55 and therefore it may be rotated by resultant pressure since all of the nozzles are aimed in one direction transverse to the axes of their associated radially extending pipes. The entire steam supply structure below the swivel joint 55 will therefore tend to rotate about the axis of the main 15 in a direction opposite to that in which the nozzles are aimed. But in case the material is too viscous to permit rotation under such pressures or in cases where large quantities of material are to be treated, the swivel coupling at 55 may be tightened or secured in the form of a rigid coupling joint and power applied to the section 14 in any suitable manner such as the pulley 56.

I claim:

1. Apparatus for heat treating foods, comprising the combination with a container, of a supply main having an axially rotating portion within the container and a nozzle carried by the supply main at a distance from said axis and provided with constricted outlets adapted to deliver sterilizing fluid in multiple jets along conically divergent lines, and means for causing the nozzle to rotate about the axis of the supply main to progressively vary the direction of fluid delivered.

2. Apparatus for heat treating foods, comprising the combination with a source of steam supply, a series of nozzles connected therewith and each having constricted outlets adapted to deliver fluid along divergent lines, said nozzles being arranged in pairs with the nozzle axes substantially aligned and with the axes of the nozzle outlets conically divergent from such lines whereby the jets from one nozzle are caused to overlap those of the companion nozzles in spaced relation thereto and means for effecting a distribution of the jets of steam by relative changes of nozzle positions within the food progressively exposing different portions of the food to the jets of steam escaping from said nozzles, including a relative bodily change in the position of the nozzles within the food and a directional change in the axis of the nozzles relatively to the body of food to be treated.

3. In apparatus for heat treating foods, the combination of a container for such foods, a rotary nozzle carrier therein, provided with a supply connection, and a set of nozzles on said carrier provided with constricted outlets disposed for jet deliveries in multiple directions which continuously change when the carrier is being rotated, said nozzles having some of their outlets disposed for jet delivery along lines oblique to the plane of carrier rotation.

4. In apparatus for heat treating foods, the combination of a container for such foods, a rotary nozzle carrier therein, provided with a supply connection, and a set of nozzles on said carrier provided with constricted outlets and the nozzles disposed in different planes and adapted for jet deliveries in multiple directions above, below and in their respective planes, each of said nozzles being in communication with the source of supply, and means for rotating the carrier.

5. In apparatus for heat treating foods, the combination of a container for such foods, a rotary nozzle carrier therein, provided with a supply connection, and a set of nozzles on said carrier provided with constricted outlets and the nozzles disposed in different planes and adapted for jet deliveries in multiple directions above, below and in their respective planes, each of said nozzles being in communication with the source of supply, and means for rotating the carrier, said rotating means comprising an arrangement of the nozzles for utilizing the resultant pressure of the escaping fluid from all of the different nozzles, in a direction of desired rotation.

6. In apparatus for heat treating foods, the combination with a source of steam supply, of a nozzle supporting rotatable supply connection, a series of nozzles having constricted outlets, said outlets being connected with said supply connection and grouped about the supply connection at different levels and at differing radial distances from said connection, each of said nozzles having its own axis substantially in a horizontal plane and its outlet ports in a line concentric to said axis with the axes of the ports conically pitched for jet delivery along a cone surface, the axis of which substantially coincides with the nozzle axis.

7. In apparatus for heat treating foods, the combination with a source of steam supply, of a nozzle supporting rotatable supply connection, a series of nozzles having constricted outlets, said outlets being connected with said supply connection and grouped about the supply connection at different levels and at differing radial distances from said connection, each of said nozzles having certain of its outlet ports adapted to deliver jets of steam in the plane of its own revolution about said axis, and other outlet ports adapted for jet delivery along divergent lines with reference to each other and to said plane, on both sides thereof.

8. In apparatus for heat treating foods, the combination of a container for such foods, a steam supply main extending into said chamber and provided with a rotatable member, a set of branch steam supply connections leading outwardly from said rotary member, to points at different radial distances from its axis of rotation, and provided with nozzle members having constricted outlet ports for jet delivery along lines variously divergent from the plane of rotation and some of said branch supply connections being located at different levels and said nozzles being grouped for delivery of steam to substantially all portions of the contents of said chamber in sweeping jets, the direction of which may be constantly changed by rotation of said supporting member.

GEORGE GRINDROD.